(12) United States Patent  
Erb et al.

(10) Patent No.: US 7,106,837 B2  
(45) Date of Patent: Sep. 12, 2006

(54) SPLIT BROWSER

(75) Inventors: Paul Andrew Erb, Ottawa (CA); Sergei Mankovskii, Markham (CA); Tom Ware, Ottawa (CA); Katherine Baker, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 318 days.

(21) Appl. No.: 10/232,146

(22) Filed: Aug. 30, 2002

(65) Prior Publication Data

US 2003/0059006 A1   Mar. 27, 2003

(30) Foreign Application Priority Data

Aug. 31, 2001   (GB) ................................. 0121160.6

(51) Int. Cl.
- H04M 1/64 (2006.01)
- H04M 11/06 (2006.01)
- H04M 1/06 (2006.01)
- G06F 15/16 (2006.01)

(52) U.S. Cl. ............................ 379/88.17; 379/93.27; 455/555; 709/228

(58) Field of Classification Search ............ 379/88.13, 379/93.27, 88.17; 455/414.1, 414.2, 414.3, 455/414.4, 462, 463; 709/221, 236
See application file for complete search history.

(56) References Cited

U.S. PATENT DOCUMENTS

| | | | |
|---|---|---|---|
| 5,761,280 A | | 6/1998 | Noonen et al. |
| 5,953,392 A | | 9/1999 | Rhie et al. |
| 6,014,439 A | * | 1/2000 | Walker et al. ......... 379/266.01 |
| 6,237,031 B1 | | 5/2001 | Knauerhase et al. |
| 6,269,336 B1 | * | 7/2001 | Ladd et al. .............. 379/88.13 |
| 6,282,272 B1 | * | 8/2001 | Noonen et al. .......... 379/93.27 |
| 6,311,215 B1 | * | 10/2001 | Bakshi et al. ................ 709/221 |
| 6,594,348 B1 | * | 7/2003 | Bjurstrom et al. ....... 379/88.13 |
| 6,731,945 B1 | * | 5/2004 | Do et al. .................... 455/463 |
| 6,775,291 B1 | * | 8/2004 | Ryu et al. ................... 370/401 |

FOREIGN PATENT DOCUMENTS

| | | |
|---|---|---|
| EP | 0859500 | 8/1998 |
| EP | 1113659 | 7/2001 |
| GB | 2307619 | 5/1997 |
| WO | 9946920 | 9/1999 |
| WO | 0130046 | 4/2001 |

OTHER PUBLICATIONS

Kumaran et al., Automated Information Entry For Wireless Devices, Apr. 11, 2002.*

* cited by examiner

Primary Examiner—Gerald Gauthier  
(74) Attorney, Agent, or Firm—Jones Day

(57) ABSTRACT

A browser for provision of web services to phone sets connected to PBXs or switches. The browser interfaces with the switches to provide content for the displays of the phone sets and to receive inputs from users for web sessions. Session support is provided in both the browser and the switches for coordination of web sessions along with telephony sessions on each of the phone sets.

10 Claims, 5 Drawing Sheets

Figure 1.1 - Architecture to enable Browser on Stimulus Phones

SPLIT BROWSER

FIELD OF INVENTION

This invention relates to browsers and in particular to a browser for providing web services to phone sets or communication devices connected to private branch exchanges (PBXs) or switches.

BACKGROUND OF THE INVENTION

A significant number of phone sets in use and in production are wireline stimulus phones, where the control of call processing and device display reside on the switches and not on the phones. In this environment, it is very difficult for application developers to develop features that can control the display on stimulus phone sets. Generally, the developers must possess the knowledge and have access to the switches to embed their applications. This is time-consuming and it is not conducive to fast development and deployment of applications. It is also difficult or impossible for developers to reuse their code across multiple platforms.

This situation is also problematic for switch vendors. Multiple services are desirable for deployment on PBX systems to satisfy customer needs. However, if the developers are required to have knowledge of and access to the switches, then it is unlikely that multiple applications can be deployed quickly or cost effectively.

Furthermore, stimulus phone set users are generally only provided with a fixed set of features to personalize their phone sets. There is a lack of applications available for such users. It would be advantageous to provide users with the ability to customize their phone sets for the applications that they find useful in addition to call control and messaging services. The applications most readily available are the vast and rapidly increasing number of services available on intranets and the Internet. Currently, web access is not available using a stimulus phone set.

An approach to providing web access is to incorporate browsers in the phone sets and wireless devices. This is exemplified by the development of Wireless Application Protocol (WAP) for wireless devices. However, PBX networks do not have the same security and bandwidth limitations as wireless networks, it is inefficient and unnecessary to have wireless transport or encryption layers of WAP taking up valuable resources on stimulus phone sets. Further, a stripped WAP browser may still have problems on stimulus phone sets which have very limited resources.

A further problem with putting browsers on stimulus phone sets is that the call processing and display functions reside on the switches. Browsers require these control features to operate properly. It is very difficult for browsers to access these control features from the phone sets. To enable installation of a browser, major changes are required to the switch-device relationship between the stimulus phone sets and their switches.

It is therefore desirable to provide browser functions to stimulus phone sets, which address the shortcomings of providing browser functions as noted above.

SUMMARY OF THE INVENTION

According to an aspect of the invention, there is provided a browser for provision of web services to phone sets connected to PBXs or switches. The browser interfaces with the switches to provide content for the displays of the phone sets and to receive inputs from users for web sessions. Session support is provided in both the browser and the switches for coordination of web sessions along with telephony sessions on each of the phone sets.

DETAILED DESCRIPTION OF THE PREFERRED EMBODIMENTS

Figure 1:
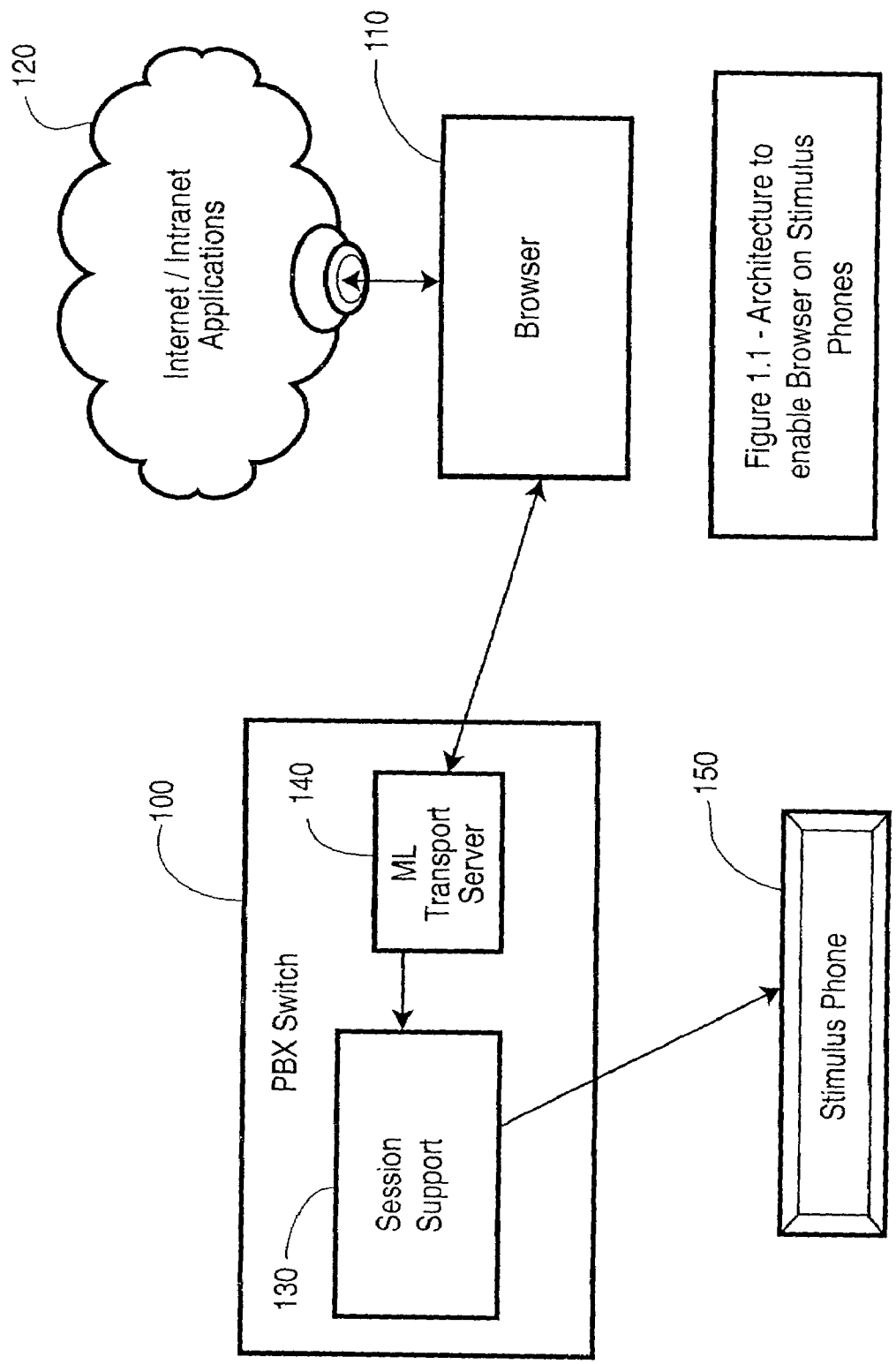
FIG. 1 is a block diagram of an architecture to enable browser functionality on stimulus phone sets in accordance with the invention.

Referring to FIG. 1, there is shown an architecture to enable browser functionality on stimulus phone sets in accordance with the invention. In this architecture, a Browser 110 has a human-machine interface layer on a PBX switch 100. The layer on the PBX switch 100 comprises a Session Support 130 to control stimulus phone sets 150, and a ML Transport Server 140 to facilitate communications with a Browser 110 for Internet/intranet Applications 120. The Browser 110 thus becomes a distributed application with different functions existing on different parts of a network.

This architecture provides a number of benefits compared to the model where the browser resides on the phone sets. First, when the Browser 110 is upgraded, it is no longer necessary to change the software on each device; the upgrade only needs to be done at one central location. This saves time and valuable resources. Secondly, because the Browser 110 resides on a server as opposed to the phone sets, the footprint and memory consumption of browsers are no longer issues. Finally, the PBX switch 100 still controls the phone sets so that there is no need for major changes to the switch-device relationship.

Under this architecture, a web session is initiated by a user (using pull) or by a server (using push). In either case, the web site serves content by sending a page or deck of cards to the Browser 110, which parses the markup language contained therein and presents the content in the appropriate form such as a page or the first card in the deck. This takes the form of lines of text for display and softkey labels with associated actions such as a link to an anchor or URL, or a script function call. After collecting this data, the Browser 110 pushes the data to the ML Transport Server using a transport mechanism that the PBX Switch 100 supports.

The Browser 110, in response to receiving an action from a user or a time related action, navigates through a deck or makes a request to a server for another page or deck or Internet/intranet Application 120 (e.g. cgi script, Java servlet) which returns appropriate content. The Browser 110 interprets one card or page at a time and passes this to the application in the PBX Switch 100. The Browser 110 in a preferred embodiment resides on a separate server connected by Internet Protocol (IP) on the PBX Switch 100.

To accommodate the Browser 110, the functions of the PBX Switch 100 further include receiving content from the Browser 110; transmitting user inputs or messages to the Browser 110; coordinating web sessions along with telephony sessions on the phone sets; and conversion of messages between the Browser 110 and the phone sets.

The ML Transport Server 140 allows communications between the PBX Switch 100 and the Browser 110. The ML Transport Server 140 receives messages and forwards the messages to the Session Support 130. The Server 140 further also sends user inputs or keystroke information to the Browser 110.

The Session Support 130 manages control of the phone sets between web sessions and telephony sessions. This coordinates browsing with Call Processing and other applications that require control of the phone sets. The Session Support 130 differentiates each user keystroke from stimulus phone sets to determine what session each keystroke was intended to be for: Call Processing, the Browser 110 or some other application. In addition, the Session Support 130 also manages presentation of parsed and interpreted pages on the phone sets.

With displayed text and softkey labels on phone sets, user actions include: pressing a softkey to select an action associated with its label; pressing a keypad digit to select an enumerated line of text (in a selection list); inputting alphanumeric text through the keypad and pressing an associated softkey; pressing a call processing hard key to temporarily suspend a current session; and using the handset (or microphone or headset) to answer or originate a call and temporarily suspend the current session.

Figure 2:
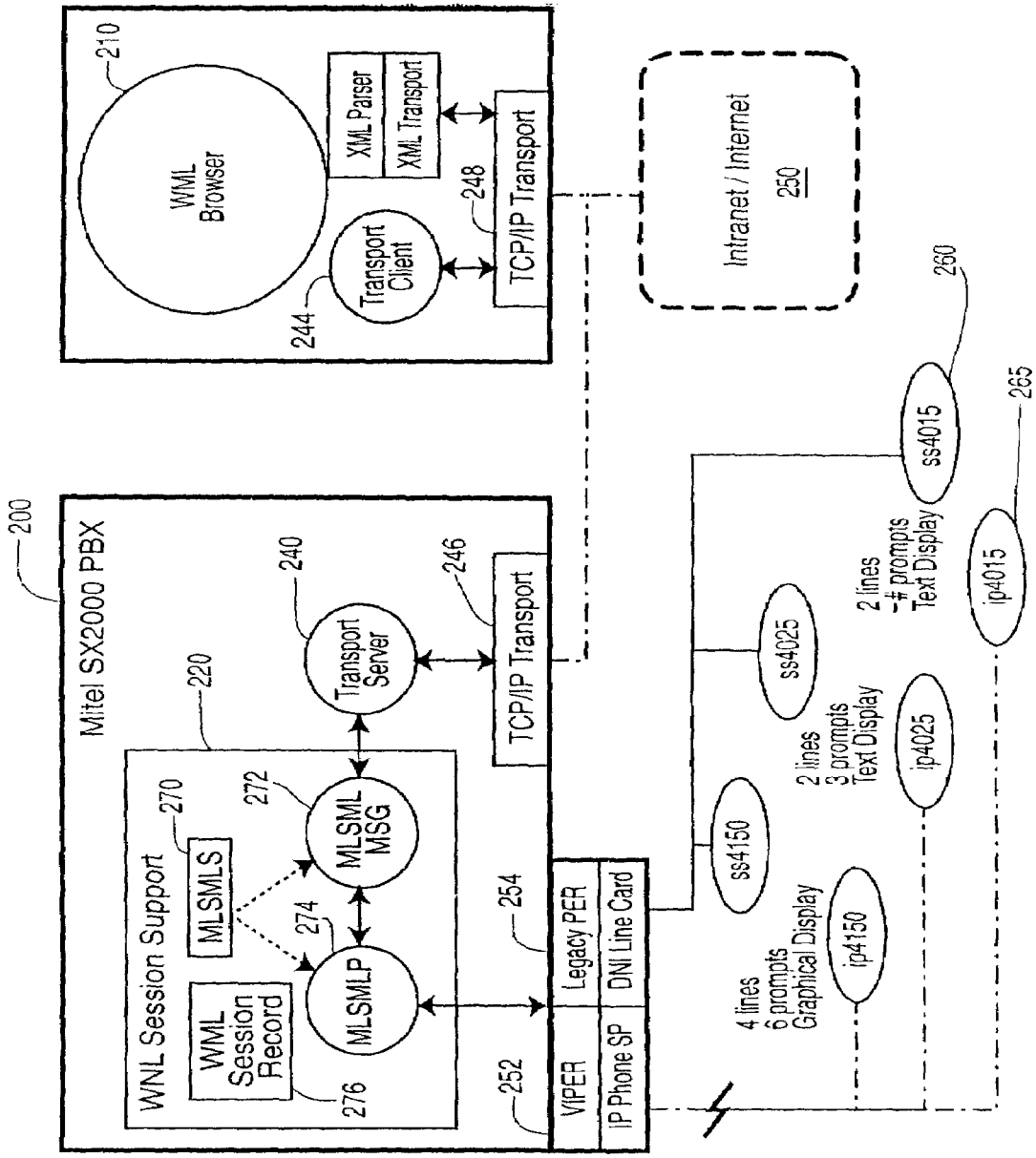
FIG. 2 is a block diagram of an implementation to enable WAP browser functionality on stimulus phones sets according to the architecture of FIG. 1.

Turning to FIG. 2, there is shown a block diagram of an implementation to enable WAP browser functionality on stimulus phones sets according to the architecture of FIG. 1 where Wireless Markup Language (WML) is used. The implementation comprises a Mitel® SX2000 PBX 200 having a WML Session Support 220, a WML Browser 210, and various Mitel IP and non-IP phone sets 260, 265. The IP phone sets 265 connect to the PBX 200 through a virtual peripheral interface 252, while the non-IP phone sets 260 use a standard peripheral interface with a DNI card 254. The PBX 200 and the WML Browser 210 communicate using TCP/IP over an intranet or the Internet 250. The components of the PBX 200 and the WML Browser 210 are isolated from the underlying communication mechanism by Transport Server 240 with TCP/IP Transport 246 and Transport Client 244 with TCP/IP Transport 248. A transport protocol named WML Transport is employed on top of TCP/IP to facilitate understanding of each WML card content between the WML Browser 210 and the PBX 200. The WML Session Support 220 comprises five sub-components: a MLSMLMSG module 272, a MLSMLP module 274, a MLSMLS module 270, and a WML Session Record 276. The MLSMLMSG module 272 handles communications between the WML Browser 210 and the WML Session Support 220 of the PBX 200.

The WML Transport includes definitions for the WML Browser 210 to initiate a new WML Session, to send a WML Card to an existing WML Session, and to terminate an existing WML Session; and for the WML Session Support 220 to initiate a new WML Session, to indicate action on an active WML Session (softkey by label, digits and/or alphanumeric text), to terminate an existing WML Session, and to respond to a WML Services operation with success or failure reasons. The WML Transport may further include definitions indicating suspension of an active WML Session (without termination) and activation of a suspended WML Session (without changing WML card).

Figure 3:
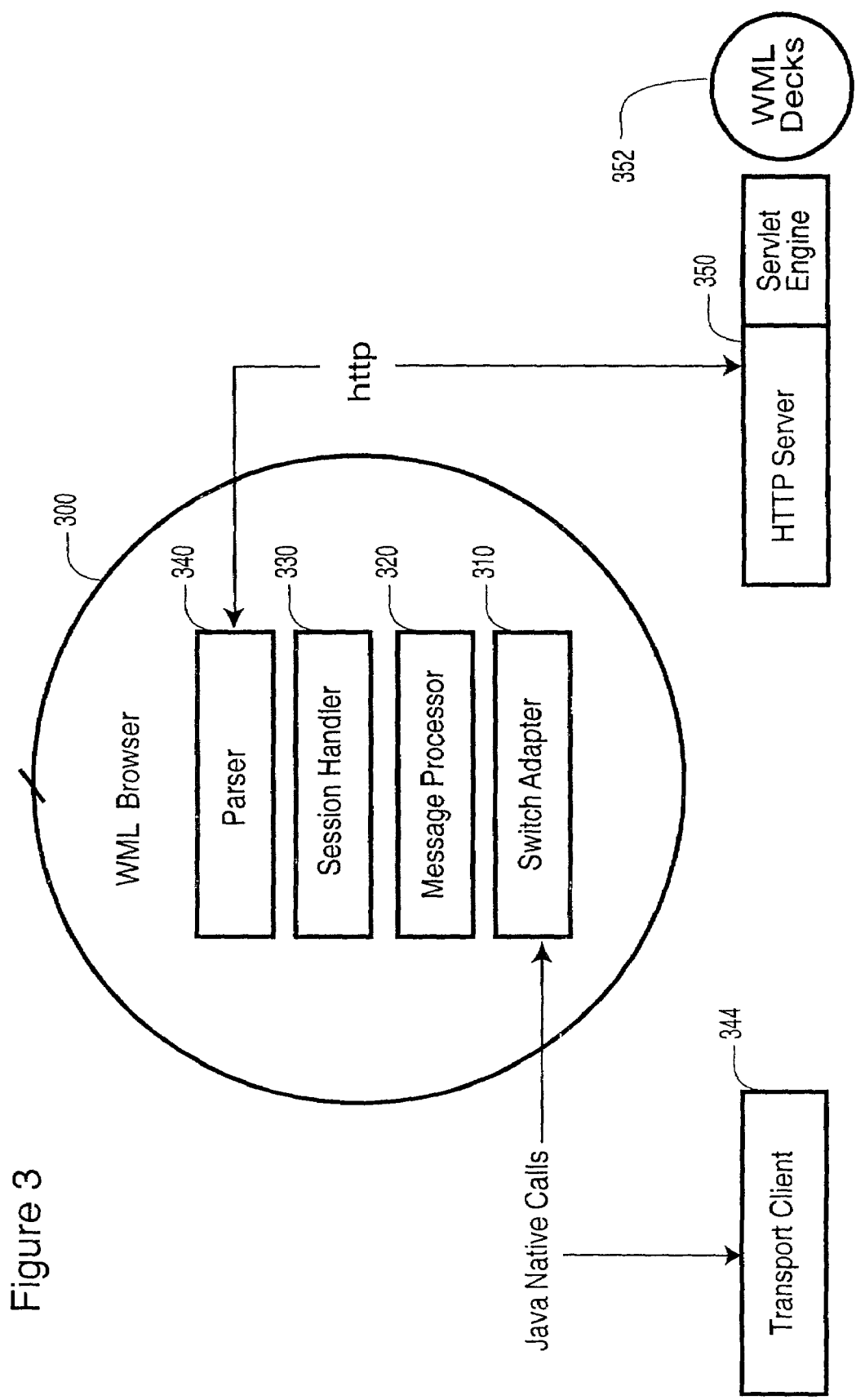
FIG. 3 is a block diagram of a WML Browser of FIG. 2.

Referring to FIG. 3, a block diagram of the WML Browser 210 is shown. The WML Browser 210 comprises a Switch Adapter 310, a Message Processor 320, Session Handler 330, and Parser 340. The Switch Adapter 310 listens for incoming messages from the PBX 200 over the Transport Client 244, and forwards any messages to the Message Processor 320. The Message Processor 320 manages WML sessions for each of the phone sets. Each WML session has an associated Session Handler 330. Each Session Handler 330 has an associated Parser 340. When a message is received, the Message Processor 320 forwards it to the appropriate Session Handler 330. Each Session Handler 330 tracks the state and the content of the WML Session of the associated phone set as well as the history of WML decks 352 that have been visited. Each WML Session has a WML deck of cards. The Parser 340 retrieves and formats the WML decks 352 for the associated Session Handler 330.

Each of the messages between the PBX 200 and the WML Browser 210 contains a device identifier to indicate the origin of a message for tracking with one Web Session. As is known in the art, alternate associations for tracking purposes are also possible.

Each Session Handler 330 processes the message with the WML session to generate responses according to the WML deck of the WML session. The responses include, for example, retrieving other WML decks 352 over the Internet 250 through HTTP Server 350.

Outgoing messages of each Session Handler 330 to the PBX 200 follow the opposite path going to the Message Processor 320 and then through the Switch Adapter 310 to the Transport Client 244 for transport. The outgoing messages are received by the PBX 200 and processed for the associated phone set.

Figure 4:
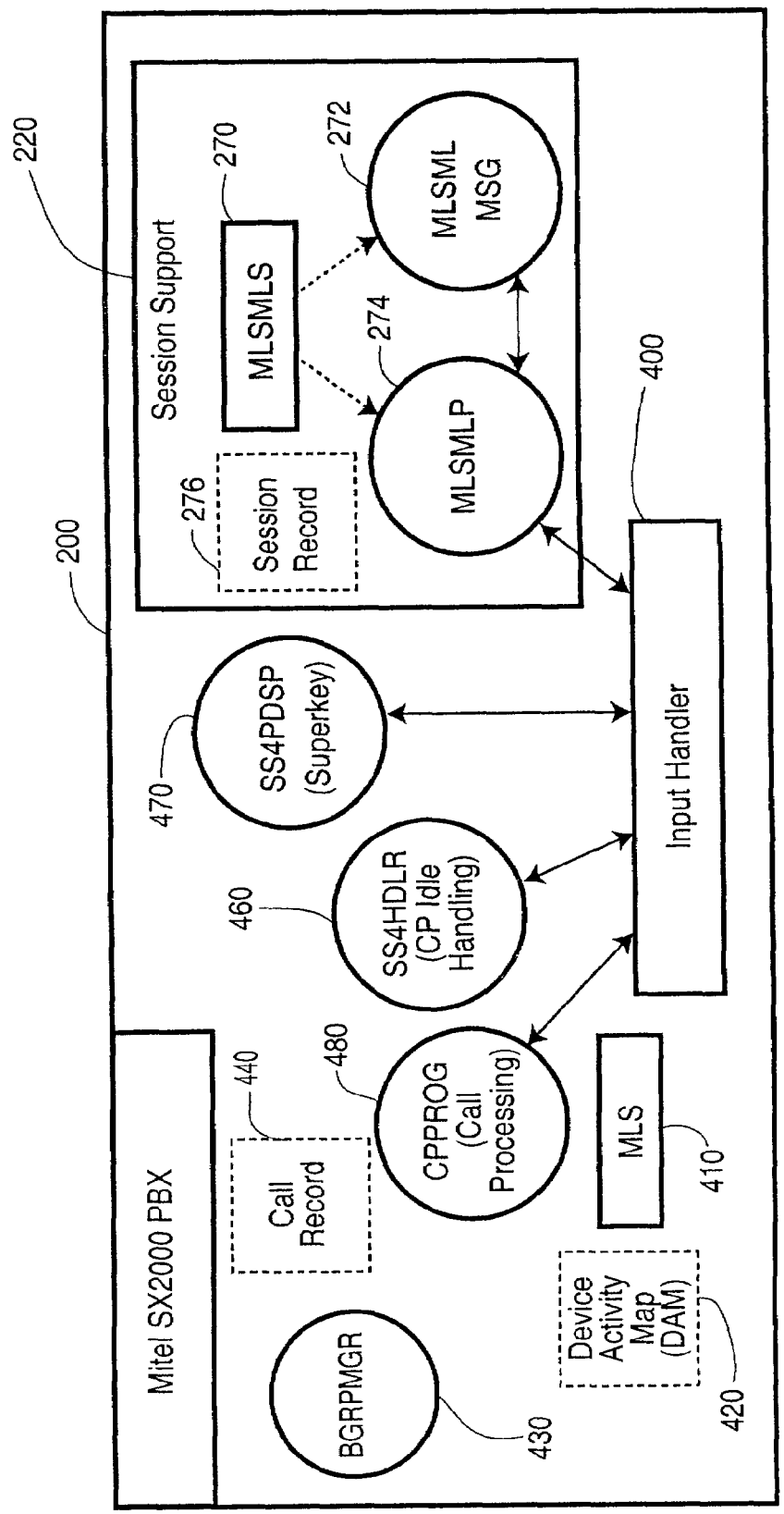
FIG. 4 is a block diagram of a PBX of FIG. 2.

Referring to FIG. 4, a block diagram of the PBX 200 of FIG. 2 is shown. The WML Session Support 220 coordinates the WML Browser 210 with the PBX's standard call processing and set handling functions. This is accomplished through the use of MLS sessions and an Input Handler 400. Thus, for each user input from a phone set, the Input Handler 400 determines which MLS Session the input is applicable.

The PBX 200 comprises a MLS facility 410, which has a Device Activity Map 420 to associate processes with each available MLS session type (Call Processing, Superkey, and WML), and to identify sessions and an active session on a phone set. The MLS facility 410 of the Mitel SX2000 PBX 200 includes support for up to six simultaneous MLS sessions; however, moving between sessions is optimized for call processing. Call Processing, being processing of voice telephone calls, is expected to be the primary function of the phone sets.

When an MLS session is active, the process associated with the session manages both the display and keystrokes of the phone set. Only one session can be active at any point in time, however, several sessions can be suspended. By default, Call Processing is active when no other session is active (handled by SS4HDLR 460).

Upon receipt of a keystroke from the phone set, the Input Handler 400 determines the appropriate context in which to service the keystroke, activates the MLS session if required, and forwards the keystroke for subsequent handling by the associated process. For example, when a softkey is pressed the Input Handler 400 passes the key to the active session process: one of CPPROG 450 for call processing, SS4HDLR 460 for call processing idle handling, SS4PDSP 470 for Superkey support on phone sets, or MLSMLP 274 for a WML Session. Further, for example, lifting the handset or pressing the speaker key suspends the active MLS session if not already suspended and forwards the keystroke to either CPPROG 450 to receive a call or SS4HDLR 460 to initiate a call.

Further, the MLS facility 410 supports MLS Session stacking where stacking is the mechanism whereby a number of sessions can be suspended in sequence. Each session maintains display and key mapping information as well as phone set configuration details (i.e. DTMF generation and time reporting). When a user exists or suspends a session, the previously active session context is then restored.

When an incoming call is presented (via BGRPMGR 430), the active session is not interrupted. Call notification is provided by ringing and LED flashing without impacting the active display. When the user selects the incoming call, the active session is then suspended and call processing becomes active to service the call.

The MLSMLMSG module 272 manages all messages between the WML Browser 210 and the PBX 200 for support of WML Sessions within the PBX 200 environment. The messages are also translated for processing by associated WML Session processes in the PBX 200 and the WML Browser 210. To correctly forward the messages, mappings of at least the WML Sessions and the phone sets are maintained.

Each MLSMLP module 274 process controls one WML session for a single device or phone set. One MLSMLP 274 process is allocated for each simultaneous WML session. Device behaviour is controlled by the associated MLSMLP 274 process whenever the WML session is active. The displays, prompts, and keystrokes of each of the phone sets are thus managed. Each WML session is activated and suspended based on context co-ordinated with call processing through the use of DAM 420.

The MLSMLS module 270 manages the allocation of resources for each WML Session. During system initialization, the MLSMLMSG 272 process is created, as well as a pool of MLSWMLP 274 processes. Every phone set with a WML session active (or suspended) requires a MLSMLP 274 process, if such a process is not available then a WML Session can not be started for the requesting phone set.

The Session Record 276 maintains information on the WML Sessions of each of the phone sets for the MLSMLMSG 272, MLSMLS 270, and MLSMLP 274 processes. One MLS Session Record 276 is maintained for each WML Session that is simultaneously available.

When serving cards of WML decks, the WML Browser 210 is not required to adapt the cards to the characteristics of each of the phone sets or devices. The characteristics of the devices are abstracted to attributes for virtual device management. Using static or dynamic discovery, each MLSWMLP 274 process on initialization determines the attributes of its associated device. The attributes include display attributes of number of lines, size, and capabilities; and prompt attributes of number of prompts, size, and positioning. This mechanism can thus be extended to handle display and softkey presentation of future desktop devices with minimal changes to the PBX 200 or WML Browser 210, if any.

Figure 5:
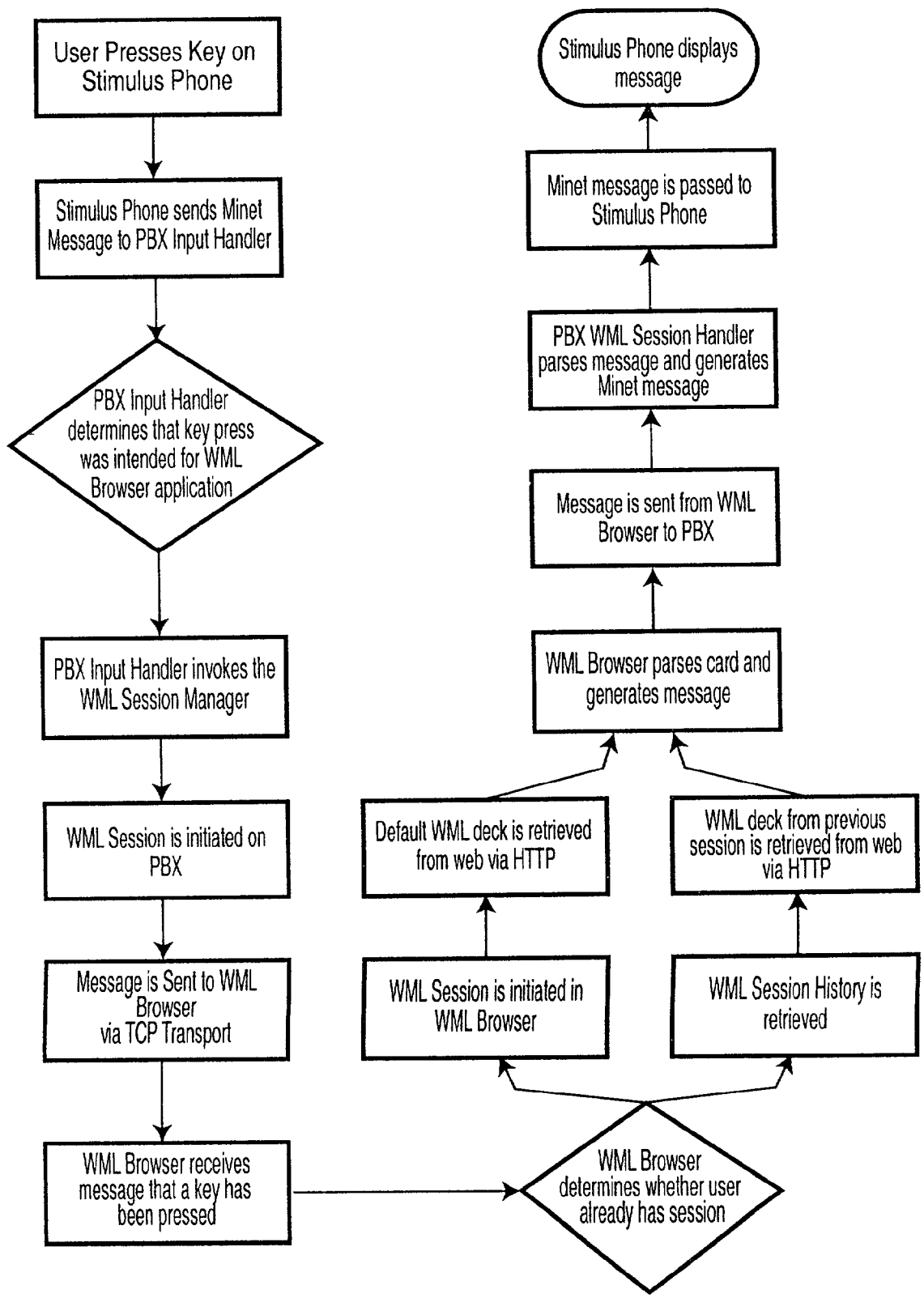
FIG. 5 is a flowchart of data flow logic from user key press to display of text on a stimulus phone set for a WML Session on the PBX of FIG. 2.

Referring to FIG. 5, a flowchart is provided of data flow logic from user key press to display of text on a stimulus phone set for a WML Session on the PBX of FIG. 2. A user presses a key on the phone set, the phone set then sends a message of the key press to the Input Handler 400. The Input Handler 400 determines whether the key press was intended for the WML Session. If the key press was intended for the WML Session then the Input Handler 400 initiates a WML Session where the message is forwarded to the WML Browser 210. Upon receiving the message of the key press, the WML Browser 210 determines whether the phone set has already started a WML Session or not. If a new WML Session is being started then a new WML Session is initialized on the WML Browser 210 and a default WML deck is retrieved. If a WML Session is running for the phone set then a history of the WML Session is retrieved with the applicable WML deck. The WML Browser 210 parses the applicable card from the WML deck and accordingly generates a responding message to the phone set, which is sent to the PBX 200. At the PBX 200, the MLSMLMSG 272 process receives the responding message and delivers it to the MLSMLP 274, which parses the responding message and accordingly generates a message for the phone set. The message is sent to the phone set where the phone set accordingly executes or displays the message.

Alternately, it will be understood by those skilled in the art that the functions necessary to support web session may be carried out either on the browser or the PBX. For example, the state and content of a web session may be processed on the PBX instead of on the browser.

Although preferred embodiments of the invention have been described herein, it will be understood by those skilled in the art that variations may be made thereto without departing from the scope of the invention or the appended claims.

What is claimed is:

1. A browser for facilitating a plurality of web sessions with web sites on respective communication devices connected to a switch, the switch managing session state and content of each of the web sessions with the communication devices, where each of the web sessions is associated with an identifier; the browser comprising:
   a communication interface for exchanging messages with the switch, wherein each of the messages contains a respective one of the identifiers;
   session records corresponding to respective ones of said web sessions, each of said session records including a session state, content and history of a respective web session; and
   parsers to format the messages as communications for sending to the web sites and to format the communication received from the web sites as the messages for the switch, wherein each of the identifiers is associated with a parser.

2. The browser of claim 1, wherein the identifiers are device identifiers.

3. The browser of claim 1, where the communications to the web sites includes getting content for the web sessions.

4. A browser for facilitating web sessions with web sites on a plurality of communication devices connected to a switch, the browser comprising:
   session records for tracking said communication devices by associating respective ones of said web sessions with respective ones of said communication devices, wherein each of said sessions records also includes a session state, content and history of the respective web session;
   a switch adaptor for exchanging messages with the switch, wherein each of the messages contains an association with at least one of said session records and one of said session records and one of said communication devices;
   a message processor for forwarding the messages according the association contained in each of the messages;
   parsers for exchanging communications with the web sites;

session handlers for processing each of the messages and the communications according to the session state and content of the respective session records and accordingly, generating at least one response, the response comprises at least one of a message and a communication;

wherein each of the session records has a respective session handler and each of the session handlers has a respective parser.

5. The browser of claim 4, wherein the association are device identifiers.

6. The browser of claim 4, wherein the communications to the web sites include requests for WML decks.

7. The browser of claim 6, wherein the web sessions are WAP web sessions.

8. A switch for facilitating a browser to provide a plurality of web sessions between respective communication devices connected to the switch and web sites, the switch comprising:

a call processor for managing arid presenting telephony sessions of the communication devices;

a web support for managing and presenting web sessions to respective communication devices, the web sessions tracked by session records on said browser and having content and associations wit respective ones of the communication devices;

a transporter for exchanging messages with the browser where the messages contain respective ones of the associations; and an input handler for receiving inputs from users of the communication devices, and in response identifying each of the inputs for forwarding to one of the call processor and the web support, the input handler having identification to determine which of the communication devices originated a given input;

wherein the web support generates for each of the inputs at least one of a response to a respective web session and one message to the browser according to the input and the content of the web session.

9. The switch of claim 8, wherein the web support manages presentation of parsed and interpreted pages on the communication devices.

10. The switch of claim 9, wherein the web sessions are WAP sessions and the pages are WML decks.

* * * * *